May 31, 1949.  H. WILKIE ET AL  2,471,470
RADIO RANGE SYSTEM
Original Filed Nov. 23, 1942
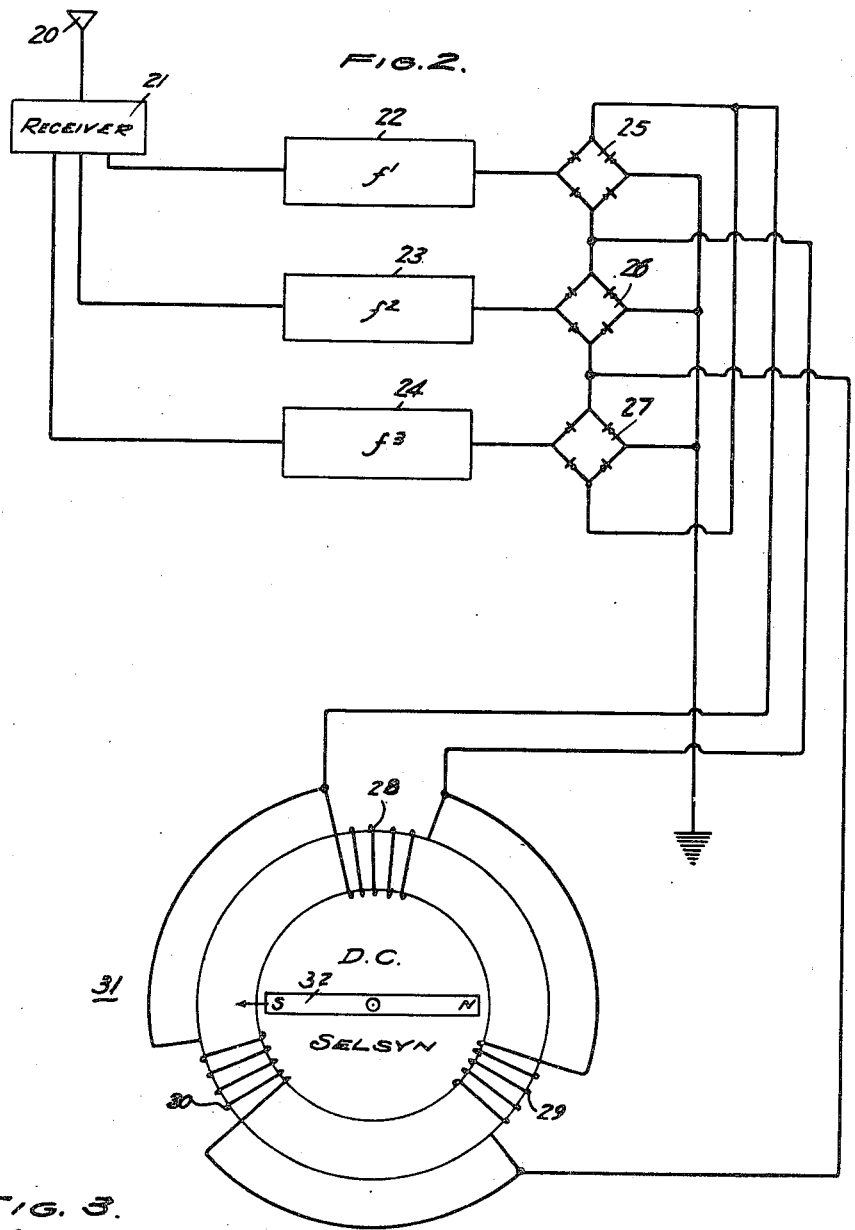
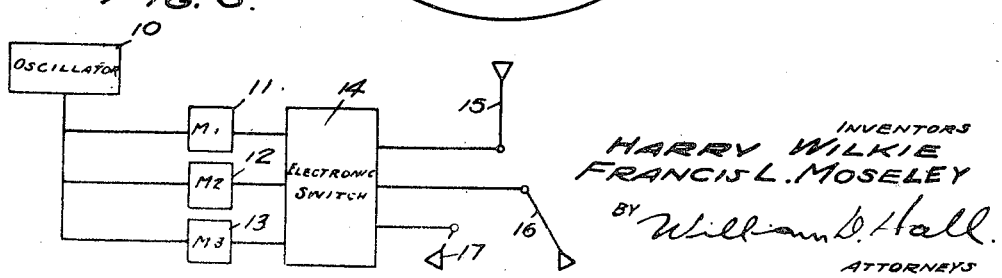
INVENTORS
HARRY WILKIE
FRANCIS L. MOSELEY
BY William D. Hall
ATTORNEYS Patented May 31, 1949

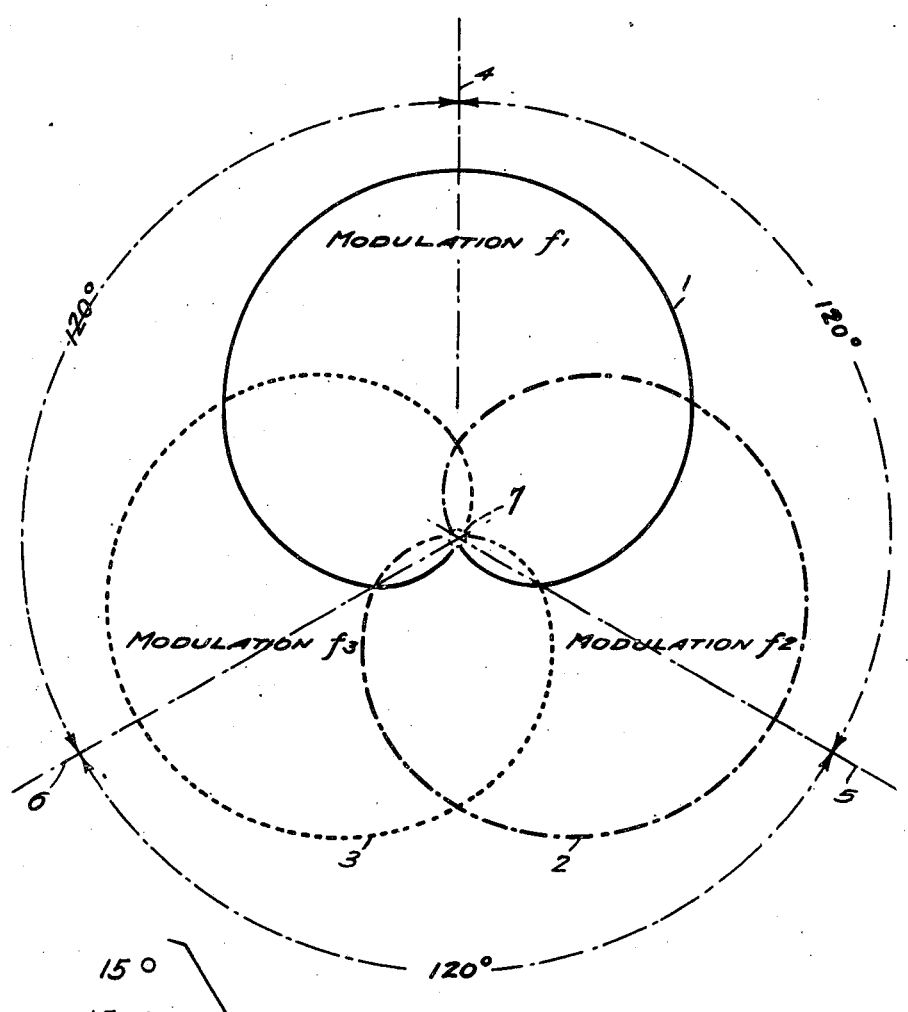
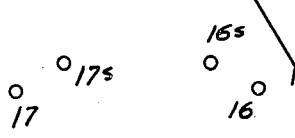

2,471,470

UNITED STATES PATENT OFFICE 2,471,470

RADIO RANGE SYSTEM

Harry Wilkie, Dayton, and Francis L. Moseley, Osborn, Ohio

Continuation of application Serial No. 466,559½, November 23, 1942. This application February 1, 1943, Serial No. 474,332

5 Claims. (Cl. 343—107)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to omni-directional radio range systems.

One object of our invention is to provide an omni-directional radio range system, wherein a standard radio receiver may be utilized with simple auxiliary indicating equipment, to establish a bearing line with respect to a radio range of known position.

Another object of this invention is to provide a radio range system whereby a traveling vehicle, such as a truck or an aircraft, may establish its line of bearing to a known radiating station, with a standard radio receiver and a simple economical auxiliary indicator.

Other objects of our invention are:

1. To provide an omni-directional range system wherein both the transmitting equipment and the receiving equipment employed are relatively simple;
2. To procure a continuous indication of the direction or bearing line;
3. To provide a system in which simple and small antenna structures may be employed; in which no effort or special attention is required on the part of the receiving station operator in order to obtain bearing; in which the entire indicating equipment will be about the size of a standard radio compass indicator; in which no adjustments will be required while the system is in use, other than ordinary receiver tuning and volume control setting and the transmitting equipment may be made portable; and in which the only labor for setting up the system would be compass orientation and the turning on of the apparatus.

The principle of operation of this invention utilizes, and is based upon, an automatic and substantially instantaneous comparison of the amplitudes received from a number of known radiation patterns from the same transmitting range. The signals are radiated sequentially in equal successive time intervals from the transmitting range and are remotely detected on the vehicle and converted to direct current impulses, and are disposed to establish co-operating magnetic fields corresponding in intensity to the respective amplitudes of the received signals. The resulting magnetic fields establish the location of the magnetic axis, which will then orient itself in a direction along the bearing line between the transmitting station and the receiver through which the indicater is energized.

By radiating the signals of different patterns in three equi-angularly spaced directions from the center of the radiating station, in such manner as to set up radiating fields having cardioidal characteristics, the received signals of the several patterns may be detected and isolated and then re-combined to measure the respective amplitudes and thereby establish the bearing line to the transmitting system.

The transmitting system comprises a stable radio transmitter, with an antenna system so energized and controlled that a number of known field strength patterns may be radiated by suitable switching controls.

In order to establish the different patterns of the radiated signals a base or carrier frequency may be modulated by a number of different frequencies to establish the number of energy impulses having different patterns that are desired.

The received signal of each pattern is segregated from the output of the standard receiver by means of a suitable tuned filter. Each impulse after having been thus segregated is preferably rectified and supplied to the appropriate winding of the stator of a Selsyn receiver indicating device.

The transmitted signals of the three different patterns, derived from the modulation of the carrier frequency by the three different modulating frequencies, energize the respective field windings of the Selsyn receiver to establish respective field intensities which vary according to the angular distance of the bearing line of the receiver from the axes of the cardioid field set up by the radiation of the signals of that particular pattern.

Since the patterns of the respective signals will be radiated in different directions around the circle of the center of the radiating system, the Selsyn indicator will always orient itself in a direction along the axis of the strongest field or resultant of the fields, which will be aligned with the bearing line between the receiver and the radiating system.

The manner in which the system is set up, and operates, is illustrated in the accompanying drawings, in which:

Figure 1 is a schematic view illustrating the disposition of the axes of the radiated fields of the respective sets of modulated signals of different frequencies;

Figure 2 is a schematic and block diagram of the radio range system including both the transmitting and receiving parts of the system.

Figure 3 is a block diagram of the transmitting system which forms part of my invention.

Figure 4 is a plan diagram of the transmitting radio antennas and their reflectors.

As shown in Figure 1, the transmitting part of the system is arranged and controlled with suitable equipment to set up three radiation fields having cardioid characteristics with the center axes of the respective fields equi-angularly spaced 120 degrees apart.

For convenience of reference, the fields will be as represented by the cardioids 1, 2, and 3, respectively related to the directional axes 4, 5, and 6. The center point 7 of the field will represent the center of the radio range from which the signals are radiated.

The apparatus and equipment that are employed in the system, as a whole, are illustrated generally in the block diagram of Figure 3, in which the transmitting equipment particularly is illustratively identified, in brief, as an oscillator 10, three modulators 11, 12 and 13, respectively, a switching device 14, and radiating antenna units 15, 16, and 17, respectively.

The receiving equipment of the system is shown as comprising, generally, a single receiving antenna 20, a receiver 21, whose output is delivered to three filters and attenuators 22, 23, and 24, respectively. The segregated received energy impulses from the filters are respectively rectified by double wave rectifiers 25, 26, and 27, and then supplied from these rectifiers to the three equally spaced windings 28, 29, and 30 of a Selsyn receiver unit 31 that also embodies a free floating indicator or magnet bar 32. That bar assumes a position along the axis of the resultant magnetic field of the three windings of the Selsyn unit.

Referring back to the transmitting part of the system, the modulators 11, 12, and 13 are operated at three different modulating frequencies to provide three dissimilar impulses that have to be separated at the receiver. The modulated signals of the three groups are transmitted for equal intervals of time and are in turn respectively supplied by suitable switching equipment, indicated by the block 14, to each of the respective radiating antennas 15, 16, and 17.

These antennas 15, 16, and 17 are physically disposed to supply both the directional characteristics, and to establish the cardioid field characteristic for the corresponding impulse transmitted by each antenna unit.

In that manner, all of the energy impulses of the same modulating frequency, and of the same pattern are radiated in the same direction. The respective fields are disposed around the circle having the radio range at the center, and these fields provide a coordinated radiation pattern in which the result will be radiantly oriented, and therefore will always be a bearing line passing through the center of the radiation system.

At the receiver, the several impulses are disposed to be segregated and physically disposed in the corresponding manner in which the impulses are transmitted so that the benefit of the directional effect may be procured.

Thus, where the modulated impulses are transmitted in the sequence of the modulators 11, 12, and 13, the corresponding detected impulses of the modulating frequencies passed through the filters 22, 23, and 24 should be supplied to the windings of the Selsyn unit 31, so that the rectified impulses will energize the windings 28, 29, and 30 in the same sequence with the windings physically disposed in the same relative position as the field patterns in Figure 1, corresponding to the radiations from the transmitting antenna units 15, 16, and 17, respectively.

The resultant field set up by the windings 28, 29 and 30 will be oriented with its axis in the direction of the bearing line between the receiver and the transmitting radio range. The indicator bar 32 will align itself along that axis and will serve to indicate the direction of the bearing lines.

Figure 4 illustrates an antenna system for producing the field pattern of Figure 1. Three antennas 15, 16, and 17 located at the vertices of an equilateral triangle. Three reflectors 15s, 16s and 17s are used to reflect the wave and create the desired directional effect. It is understood that while three antennas are shown, the basic principle of our invention is not limited thereto as any number designed to create a rotating field will operate.

If the radio receiving system of Figure 2 is located on an airplane or balloon directly above the center of the antenna system, the apparatus will be a true Selsyn system and the indicator 32 will rotate synchronously with the frequency of the system. If the indicator is directly above the station it may be rotated to any fixed position by energizing any one or two of the antennas 15, 16, and 17. However, the main use for this invention is to guide an airplane to an airport and when this is done, the antenna 15, 16, and 17 are intermittently and successively energized by the three modulating frequencies. Hence a rotating field is set up around the antennas and the airport. The equipment of Figure 2 is located on the aircraft and the Selsyn bar 32 always indicates the correct direction toward the airport.

This application is a continuation of our prior copending application entitled Radio range system, filed November 23, 1942, Serial No. 466,559½, now abandoned.

We claim:

1. An omni-directional radio range system, comprising a radiating system of equi-angularly spaced radiating units; a source of carrier frequency; means for modulating the carrier source to derive three dissimilar energy wave impulses; means for transmitting those respective impulses sequentially to the respective radiating units during successive equal time intervals, thereby to establish a rotating radiation field with directional characteristics; means for receiving and segregating the wave impulses, rectifying them, and setting up in the same sequence, adjacent direct mutual manual magnetic fields equi-angularly spaced; and means for indicating the location of the magnetic axis of the mutual field.

2. The method of operating an omni-directional range system, which consists in generating an alternating voltage of constant frequency; modulating that voltage separately by three voltages of different frequencies to derive three modulated wave impulses of dissimilar pattern; radiating the impulses in fixed sequence and in successive time intervals to establish equi-angularly spaced fields having cardioid characteristics; remotely detecting, and segregating, and rectifying the impulses; and supplying those pulses in the same sequence as their radiation, to equally spaced windings of a Selsyn receiver whose rotor is free floating to orient itself along the magnetic axis of the resultant mutual field of the Selsyn windings.

3. An omni-directional range system comprising a radiating assembly including means for radiating a train of wave impulses in fixed sequence and in successive time intervals, means to establish equi-angularly spaced fields having cardioid characteristics, said impulses having dissimilar patterns established by three different modulating frequencies, and means for detecting the impulses and converting them to equally spaced mutual magnetic forces to establish a resultant magnetic axis of the common field; and means for indicating the relative location of the resultant magnetic axis so established.

4. An omni-directional range system comprising a source of fixed carrier frequency; means for modulating the carrier to derive a plurality of dissimilar wave impulses in regular and recurring sequence at equally spaced time intervals; means for radiating the impulses in the same sequence and time intervals and in equi-angularly spaced directions, thereby to establish a rotating radiation field with directional characteristics; and remote means for detecting the radiated impulses, rectifying them, and setting up therewith in the same sequence, adjacent equi-angularly distributed direct mutual magnetic flux fields in proportion to the strength of the respective received impulses, to establish a resultant magnetic field whose axis will be oriented in the direction of the strongest received impulse of the sequence.

5. An omni-directional radio range system, comprising a radiating system of equi-angularly spaced radiating units; a source of carrier frequency; means for modulating the carrier source to derive a plurality of dissimilar energy wave impulses; means for transmitting those respective impulses sequentally to the respective radiating units during successive equal time intervals thereby to establish a rotating radiation field with directional characteristics; means for receiving and segregating the wave impulses, rectifying them, and setting up in the same sequence, adjacent direct mutual magnetic fields equi-angularly spaced; and means for indicating the location of the resultant magnetic axis of the mutual field.

HARRY WILKIE.
FRANCIS L. MOSELEY.

REFERENCES CITED

The following references are of record in the file of this patent:

UNITED STATES PATENTS

| Number | Name | Date |
| --- | --- | --- |
| 1,839,290 | Bailey | Jan. 5, 1932 |
| 1,898,058 | Lindenblad | Feb. 21, 1933 |
| 1,961,206 | Diamond | June 5, 1934 |
| 2,063,610 | Linsell | Dec. 8, 1936 |
| 2,128,923 | Dunmore | Sept. 6, 1938 |
| 2,208,921 | Busignies | July 23, 1940 |
| 2,257,320 | Williams | Sept. 30, 1941 |
| 2,288,815 | Luck | July 7, 1942 |